(12) United States Patent
BenHanokh et al.

(10) Patent No.: US 11,579,781 B2
(45) Date of Patent: Feb. 14, 2023

(54) POOLING DISTRIBUTED STORAGE NODES THAT HAVE SPECIALIZED HARDWARE

(71) Applicant: Red Hat, Inc., Raleigh, NC (US)

(72) Inventors: Gabriel Zvi BenHanokh, Tel-Aviv (IL); Brett Niver, Grafton, MA (US)

(73) Assignee: RED HAT, INC., Raleigh, NC (US)

( * ) Notice: Subject to any disclaimer, the term of this patent is extended or adjusted under 35 U.S.C. 154(b) by 90 days.

(21) Appl. No.: 17/078,504

(22) Filed: Oct. 23, 2020

(65) Prior Publication Data

US 2022/0129170 A1 Apr. 28, 2022

(51) Int. Cl.
*G06F 12/00* (2006.01)
*G06F 13/00* (2006.01)
*G06F 3/06* (2006.01)

(52) U.S. Cl.
CPC ............ *G06F 3/0623* (2013.01); *G06F 3/067* (2013.01); *G06F 3/0644* (2013.01); *G06F 3/0659* (2013.01); *G06F 3/0664* (2013.01); *G06F 3/0683* (2013.01)

(58) Field of Classification Search
CPC .... G06F 3/0623; G06F 3/0644; G06F 3/0659; G06F 3/0664; G06F 3/067; G06F 3/0683
USPC ......................................................... 711/163
See application file for complete search history.

(56) References Cited

U.S. PATENT DOCUMENTS

| | | | |
|---|---|---|---|
| 7,277,431 B2 | 10/2007 | Walter et al. | |
| 7,860,255 B2 * | 12/2010 | Nonaka | H04L 9/0891 380/279 |
| 7,877,601 B2 * | 1/2011 | Smith | H04L 63/20 726/13 |
| 8,041,941 B2 | 10/2011 | Walter et al. | |
| 8,166,314 B1 * | 4/2012 | Raizen | G06F 21/78 713/193 |
| 8,434,087 B2 | 4/2013 | Degenaro et al. | |
| 9,448,846 B2 | 9/2016 | Bass et al. | |
| 9,787,522 B1 * | 10/2017 | Contreras | H04L 69/14 |
| 10,133,505 B1 * | 11/2018 | LeCrone | G06F 3/0659 |
| 10,454,498 B1 * | 10/2019 | Mao | H03M 7/6023 |
| 10,489,215 B1 * | 11/2019 | Wen | G06F 11/3442 |
| 11,100,267 B1 * | 8/2021 | Guggilla | G06F 30/337 |

(Continued)

FOREIGN PATENT DOCUMENTS

CN 106341417 B 11/2019

OTHER PUBLICATIONS

Andrei, P.S., et al., "Hardware Acceleration in CEPH Distributed File System," IEEE 12th International Symposium on Parallel and Distributed Computing, 2013, https://ieeexplore.ieee.org/abstract/document/6663583.

*Primary Examiner* — Sheng Jen Tsai
(74) *Attorney, Agent, or Firm* — Kilpatrick Townsend & Stockton LLP

(57) ABSTRACT

Distributed storage nodes having specialized hardware can be pooled for servicing data requests. For example, a distributed storage system can include a group of storage nodes. The distributed storage system can determine a subset of storage nodes that include the specialized hardware based on status information received from the group of storage nodes. The specialized hardware can be preconfigured with specialized functionality. The distributed storage system can then generate a node pool that includes the subset of storage nodes with the specialized hardware. The node pool can be configured to perform the specialized functionality in relation to a data request.

20 Claims, 5 Drawing Sheets

---

502
Determine a subset of storage nodes that include specialized hardware based on status information received from a plurality of storage nodes of the distributed storage system, wherein the specialized hardware is preconfigured with specialized functionality for compressing data or encrypting data

↓

504
Generate a node pool that includes the subset of storage nodes with the specialized hardware, the node pool being configured to perform the specialized functionality in relation to a data request

(56) References Cited

U.S. PATENT DOCUMENTS

| | | | |
|---|---|---|---|
| 2004/0117621 A1 | 6/2004 | Knight | |
| 2005/0220305 A1* | 10/2005 | Fujimoto | G06F 21/606 |
| | | | 380/255 |
| 2008/0126813 A1* | 5/2008 | Kawakami | G06F 21/85 |
| | | | 713/193 |
| 2010/0031062 A1* | 2/2010 | Nishihara | G06F 21/88 |
| | | | 713/193 |
| 2010/0329256 A1* | 12/2010 | Akella | H04L 45/00 |
| | | | 370/392 |
| 2013/0151770 A1* | 6/2013 | Hara | G06F 3/0685 |
| | | | 711/E12.019 |
| 2016/0344711 A1* | 11/2016 | Rokui | H04L 63/0853 |
| 2017/0017550 A1* | 1/2017 | Matsui | G06F 11/1415 |
| 2017/0180247 A1* | 6/2017 | Lin | H04L 45/127 |
| 2021/0036714 A1* | 2/2021 | Martin | G06F 13/1668 |
| 2021/0263759 A1* | 8/2021 | Pascual | H04L 9/0894 |
| 2021/0281643 A1* | 9/2021 | Szczepanik | H04L 47/115 |
| 2021/0374568 A1* | 12/2021 | Vishwakarma | G06F 11/079 |

\* cited by examiner

POOLING DISTRIBUTED STORAGE NODES THAT HAVE SPECIALIZED HARDWARE

TECHNICAL FIELD

The present disclosure relates generally to distributed storage systems. More specifically, but not by way of limitation, this disclosure relates to pooling storage nodes of a distributed storage system that have specialized hardware, such as hardware with built-in compression or encryption capabilities.

BACKGROUND

Distributed storage systems can include storage nodes in communication with each other over a network for synchronizing, coordinating, and storing data. The storage nodes can work together so that the distributed storage system behaves as one storage system. Distributed storage systems can implement block storage, file storage, or object storage techniques.

There are numerous advantages to using distributed storage systems, such as improved scalability, redundancy, and performance. In particular, distributed storage systems can be easily scaled horizontally, in the sense that they can combine many storage nodes into a single, shared storage system. Distributed storage systems can also store many copies of the same data for high availability, backup, and disaster recovery purposes. Additionally, some distributed storage systems can execute compute workloads on the same storage nodes that are also used to store data, thereby yielding a hyper-converged infrastructure that is highly efficient.

DETAILED DESCRIPTION

Figure 1:
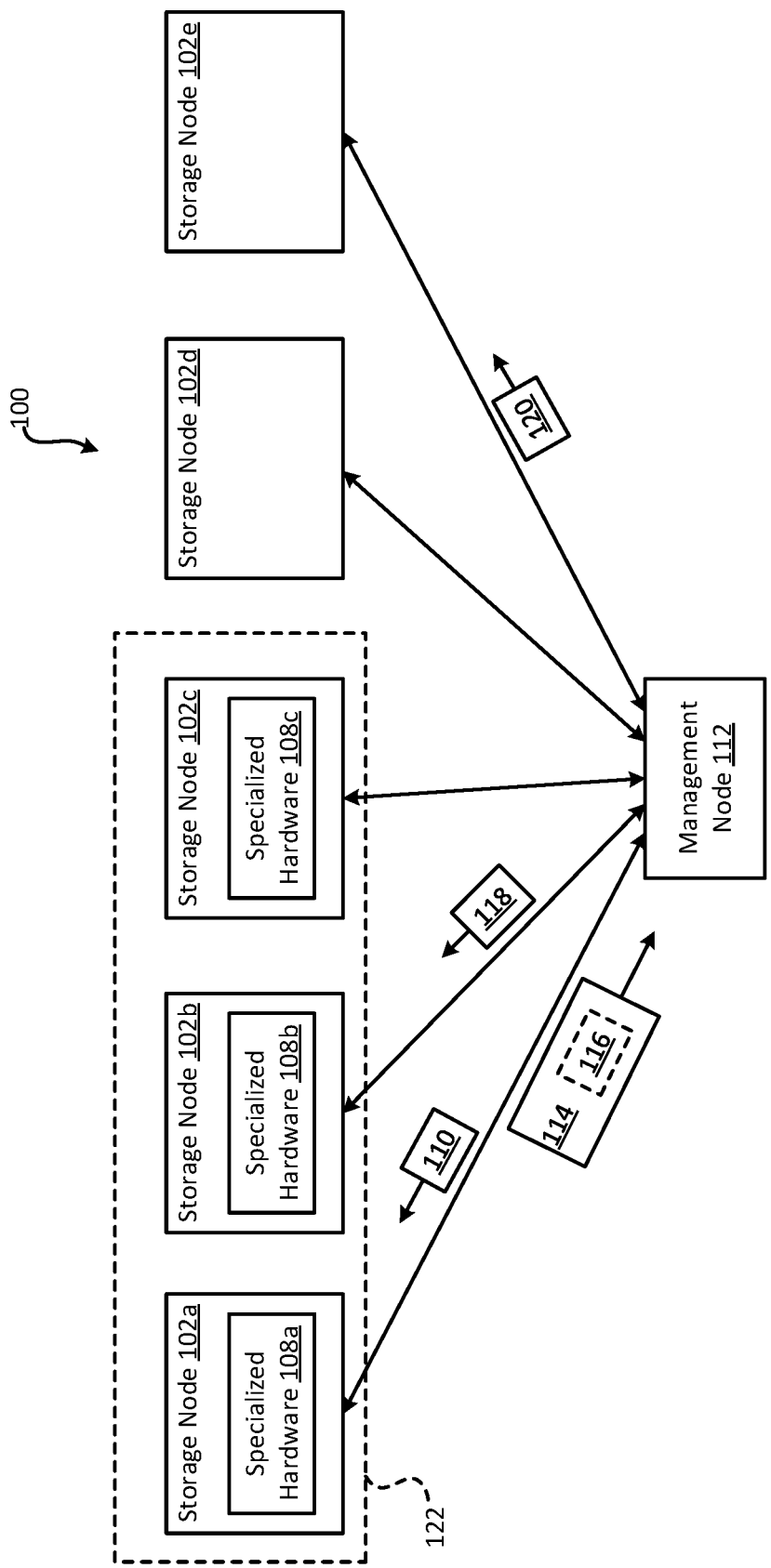
FIG. 1 is a block diagram of an example of a distributed storage system according to some aspects of the present disclosure.

A distributed storage system can include storage nodes formed from relatively heterogeneous servers in communication with each other over a network, such as a local area network. Some of the storage nodes may have specialized hardware. Specialized hardware is a piece of hardware that is preconfigured by a manufacturer to implement specialized functionality, prior to receipt of the specialized hardware by an end user. For example, the specialized hardware can include specialized circuitry configured to implement the specialized functionality. The specialized circuitry may include a custom or semi-custom integrated circuit with a special hardware design or firmware specifically tailored for performing the specialized functionality, where the specialized circuitry is built into the specialized hardware by a manufacturer during a manufacturing process. Thus, specialized hardware is different from generic hardware on which aftermarket software is installed by the end user to implement the specialized functionality. The specialized functionality can be functionality that is supplemental to the main purpose of the piece of hardware. By way of example, the specialized hardware can include a storage adapter, a storage device, an input/output (I/O) interface, or a processing device, where the specialized hardware has appropriate circuitry built-in to implement specialized functionality such as data encryption, data compression, and checksum calculation capabilities. As one particular example, the specialized hardware can be a self-encrypting hard drive with inline data-encryption capabilities. Using specialized hardware to perform the specialized functionality can be faster and more robust than executing aftermarket software on generic hardware.

While some storage nodes may have the specialized hardware, other storage nodes may not. In such situations, the distributed storage system may operate as if all of the storage nodes lack the specialized hardware, since distributed storage systems generally operate on the basis of the lowest common denominator. As a result, the distributed storage system may not implement the specialized functionality of the specialized hardware, even though the specialized functionality could improve the distributed storage system.

Some examples of the present disclosure can overcome one or more of the abovementioned problems by identifying storage nodes in a distributed storage system that have specialized hardware with specialized functionality, enabling the specialized functionality on the storage nodes, grouping the storage nodes together into a pool of storage nodes ("node pool") that have the specialized functionality enabled, and using the node pool to utilize the specialized functionality in relation to data requests. The data requests can include read requests for reading data, write requests for writing data, or both. Grouping the storage nodes in this way can prevent the data requests from being divided up among some storage nodes that have the specialized hardware and other storage nodes that lack the specialized hardware, so that the data requests arrive at a node pool in which all of the storage node members have the specialized hardware or none of the storage node members have the specialized hardware. With the data requests arriving at a node pool in which all of the storage nodes have the specialized hardware, the distributed storage system can leverage the specialized functionality to achieve various improvements, such as improvements to data security and throughput.

One particular example can involve a distributed storage system, such as Ceph Storage by Red Hat®. The distributed storage system can include hundreds or thousands of storage nodes. Each storage node can determine if it has specialized hardware capable of performing specialized functionality, such as data encryption, data compression, or both. Each storage node may determine if it has the specialized hardware by scanning its hardware. For example, a storage node can analyze its hardware upon booting up to determine if the specialized hardware is connected. As another example, a storage node may periodically analyze its hardware at predefined intervals to determine if the specialized hardware is connected. As yet another example, a storage node may analyze its hardware in response to an event determine if the specialized hardware is connected. After scanning their hardware, the storage nodes can then transmit status communications indicating whether or not they have the specialized hardware capable of performing the specialized functionality.

A centralized management node of the distributed storage system can receive the status communications from the storage nodes. Based on the status communications, the management node can determine a subset of the storage nodes that have the specialized hardware. The management node may then transmit communications to the subset of storage nodes for causing the storage nodes to enable the specialized functionality. Alternatively, the storage nodes may automatically enable the specialized functionality upon discovering that they are connected to the specialized hardware. Either way, the specialized functionality can be enabled on the storage nodes.

Next, the management node can assign the storage nodes in the subset to the same node pool. As a result, the node pool may only contain storage nodes with specialized hardware capable of performing the specialized functionality. The node pool can then be used to service data requests, so that the specialized functionality can be performed in relation to the data requests. Such node pools may be considered higher-tiered pools with better performance or data protection, given their specialized functionality. Thus, a service provider that is selling access to the distributed storage system may charge higher fees for using the node pool than for other node pools, such as node pools that lack specialized hardware with the specialized functionality.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed storage system 100 according to some aspects of the present disclosure. The distributed storage system 100 includes storage nodes 102*a-e*. The storage nodes 102*a-e* may be physical servers for storing data.

Some storage nodes 102*a-c* can have specialized hardware 108*a-c*, while other storage nodes 102*d-e* may lack the specialized hardware. Examples of the specialized hardware 108*a-c* can include a storage adapter for interacting with storage devices, a storage device such as a hard disk or solid-state drive, a processing device such as a central processing unit (CPU) or graphics processing unit (GPU), or an I/O interface such as a peripheral component interface (PCI) card. The specialized hardware 108*a-c* may be internal to the storage nodes 102*a-c* or external and coupled to the storage nodes 102*a-c*. The specialized hardware 108*a-c* is configured to implement specialized functionality. Examples of the specialized functionality can include data compression/decompression capabilities, data encryption/decryption capabilities, checksum calculation capabilities, or any combination of these. The specialized functionality may be selectively enabled and disabled.

In some examples, the storage nodes 102*a-e* can each analyze their hardware to determine if they have a corresponding piece of specialized hardware. For example, storage nodes 102*a-c* may analyze their hardware and determine that the specialized hardware 108*a-c* is attached. And storage nodes 102*d-e* may analyze their hardware and determine that they lack the specialized hardware. The storage nodes 102*a-e* may analyze their hardware to determine if they have the specialized hardware in response to any suitable event. For example, the storage nodes 102*a-e* may each analyze their hardware to detect the presence of a piece of specialized hardware in response to a boot up event. As another example, the storage nodes 102*a-e* may each analyze their hardware to detect the presence of the specialized hardware in response to the passage of a predefined amount of time, such as one hour. As yet another example, the storage nodes 102*a-e* may each analyze their hardware to detect the presence of the specialized hardware in response to a request 110 from a management node 112 of the distributed storage system 100. One example of such a request 110 is shown in FIG. 1, but the management node 112 can transmit similar types of requests to many or all of the storage nodes 102*a-e*.

After analyzing their hardware, the storage nodes 102*a-e* can generate respective status information indicating whether or not they have the specialized hardware. Each of the storage nodes 102*a-e* can then transmit a status communication that includes the respective status information over a network to the management node 112. The network may be a local area network or the Internet. One example of such a status communication 114 with status information 116 is shown in FIG. 1, but many or all of the storage nodes 102*a-e* may transmit similar types of status communications to the management node 112.

The management node 112 is configured to manage one or more aspects of the distributed storage system 100. For example, the management node 112 can generate node pools and manage which virtual storage units are mapped to which nodes. The management node 112 may also manage which storage nodes 102*a-e* have write-back caching enabled or disabled, as described below.

In some examples, the management node 112 can receive the status communications from the storage nodes 102*a-e* and determine a subset of storage nodes 102*a-c* that have the specialized hardware 108*a-c* based on the status information in the status communications. The specialized functionality of the specialized hardware 108*a-c* can then be enabled on the subset of storage nodes 102*a-c*. For example, the management node 112 can transmit signals, such as signal 118, to the subset of storage nodes 102*a-c* for causing the storage nodes 102*a-c* to enable the specialized functionality. Each signal can include a command or other information configured to cause a corresponding storage node to enable the specialized functionality. For instance, the storage nodes 102*a-c* may be in a first state in which the specialized functionality is disabled. To enable the specialized functionality on the storage nodes 102*a-c*, the management node 112 can transmit signals with activation commands to the storage nodes 102*a-c*. The storage nodes 102*a-c* can receive the signals, detect the activation commands in the signals, and responsively switch from the first state to a second state in which the specialized functionality is enabled. In other examples, at least some of the storage nodes 102*a-c* may automatically enable the specialized functionality in response to determining that they have back the specialized hardware 108*a-c*. In still other examples, a system administrator may manually enable the specialized functionality on at least some of the storage nodes 102*a-c* based on determining that the storage nodes 102*a-c* have specialized hardware 108*a-c*. By using one or more of the above techniques, the specialized functionality can be enabled on the storage nodes 102*a-c*.

With the specialized functionality engaged on the subset of storage nodes 102*a-c*, the management node 112 can assign the subset of storage nodes 102*a-c* to a node pool 122. A node pool can be a defined group of storage nodes configured to implement storage functionality to service one or more read/write requests. In this example, the node pool 122 only includes the storage nodes 102a-c that have the specialized hardware 108a-c. The node pool 122 may be designated as a higher-tiered pool, since it may have better performance characteristics than another node pool (e.g., formed from storage nodes 102d-e) that lacks the specialized hardware or specialized functionality.

A user can obtain access to the node pool 122 for storing data. For example, a user may purchase a subscription to the node pool 122, allowing the user to store and retrieve data therefrom by submitting data requests. Upon the user being granted such access, the distributed storage system 100 can cause the node pool 122 to perform the specialized functionality in relation to the data requests submitted by the user. The specialized functionality may yield better performance or security than is otherwise possible absent the specialized functionality.

In some examples, storage nodes may have more than one type of specialized hardware or may have specialize hardware capable of implementing more than one type of specialized functionality. In some such examples, the management node 112 can group together storage nodes having the same amounts and/or types of specialized functionality into the same node pool. For example, the distributed storage system 100 can include a first set of storage nodes with specialized hardware for implementing both data encryption and data compression. The distributed storage system 100 can also include a second set of storage nodes with specialized hardware for implementing data encryption but not data compression. And the distributed storage system 100 include a third set of storage nodes with specialized hardware for implementing data compression but not data encryption. As a result, the first set of storage nodes may be grouped into a first node pool capable of implementing both data encryption and data compression. The second set of storage nodes may be grouped into a second node pool capable of implementing data encryption but not data compression. And the third set of storage nodes may be grouped into a third node pool capable of implementing data compression but not data encryption. A user may purchase a subscription to whichever of the node pools meets the user's needs, where the first node pool may be more expensive than the second node pool or the third node pool.

It will be appreciated that FIG. 1 is intended to be illustrative and non-limiting. Other examples may include more components, fewer components, different components, or a different arrangement of the components shown in FIG. 1. For instance, although the distributed storage system 100 includes five storage nodes in the example of FIG. 1, the distributed storage system 100 may have hundreds or thousands of storage nodes in other examples.

Figure 2:
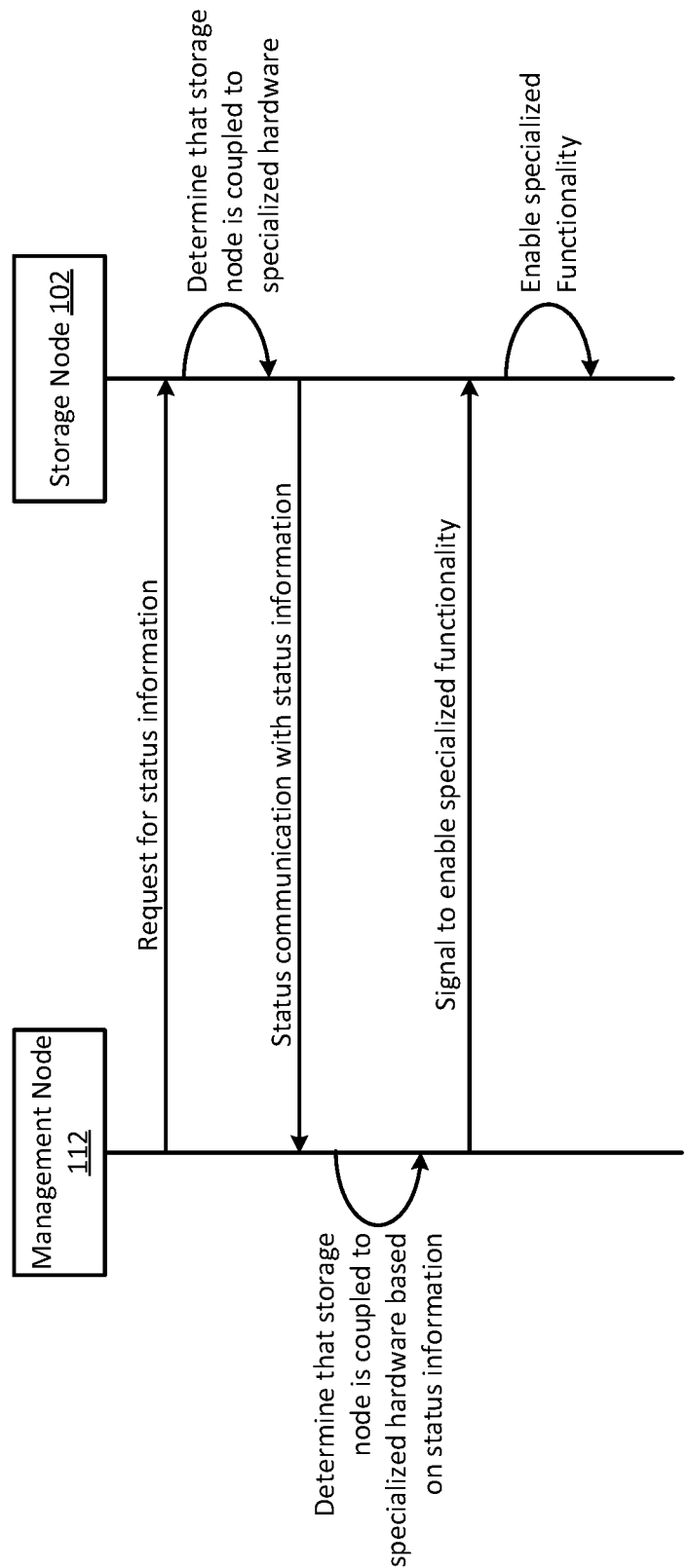
FIG. 2 is a sequence diagram of an example of a process for enabling specialized functionality on a storage node according to some aspects of the present disclosure.

FIG. 2 is a sequence diagram of an example of a process for enabling specialized functionality on distributed storage nodes according to some aspects of the present disclosure. Although the example shown in FIG. 2 includes a certain sequence of steps, other examples may involve more steps, fewer steps, different steps, or a different order of the steps shown in FIG. 2.

The process begins with a management node 112 of a distributed storage system transmitting a request for status information to a storage node 102. The storage node 102 can receive the request and responsively determine if specialized hardware is coupled to the storage node. In this example, the storage node 102 has determined that the specialized hardware is coupled to the storage node 102. Next, the storage node 102 can transmit a response to the request, where the response is in the form of a status communication with status information indicating that the storage node 102 is coupled to the specialized hardware. The management node 112 can receive the status communication and determine that the storage node 102 is coupled to the specialized hardware based on the status information. The management node 112 may then transmit a signal to the storage node 102 for causing the storage node 102 to enable the specialized functionality of the specialized hardware. The storage node 102 can receive the signal and responsively enable the specialized functionality.

In some examples, the distributed storage system can use the storage node 102 to service a data request. The data request may be a higher-priority data request for which the specialized functionality may be desirable. A data request may be higher-priority if it is more critical, demanding, or higher cost than other data requests. For example, a user may pay a premium for the user's data requests to be deemed higher priority.

Figure 3:
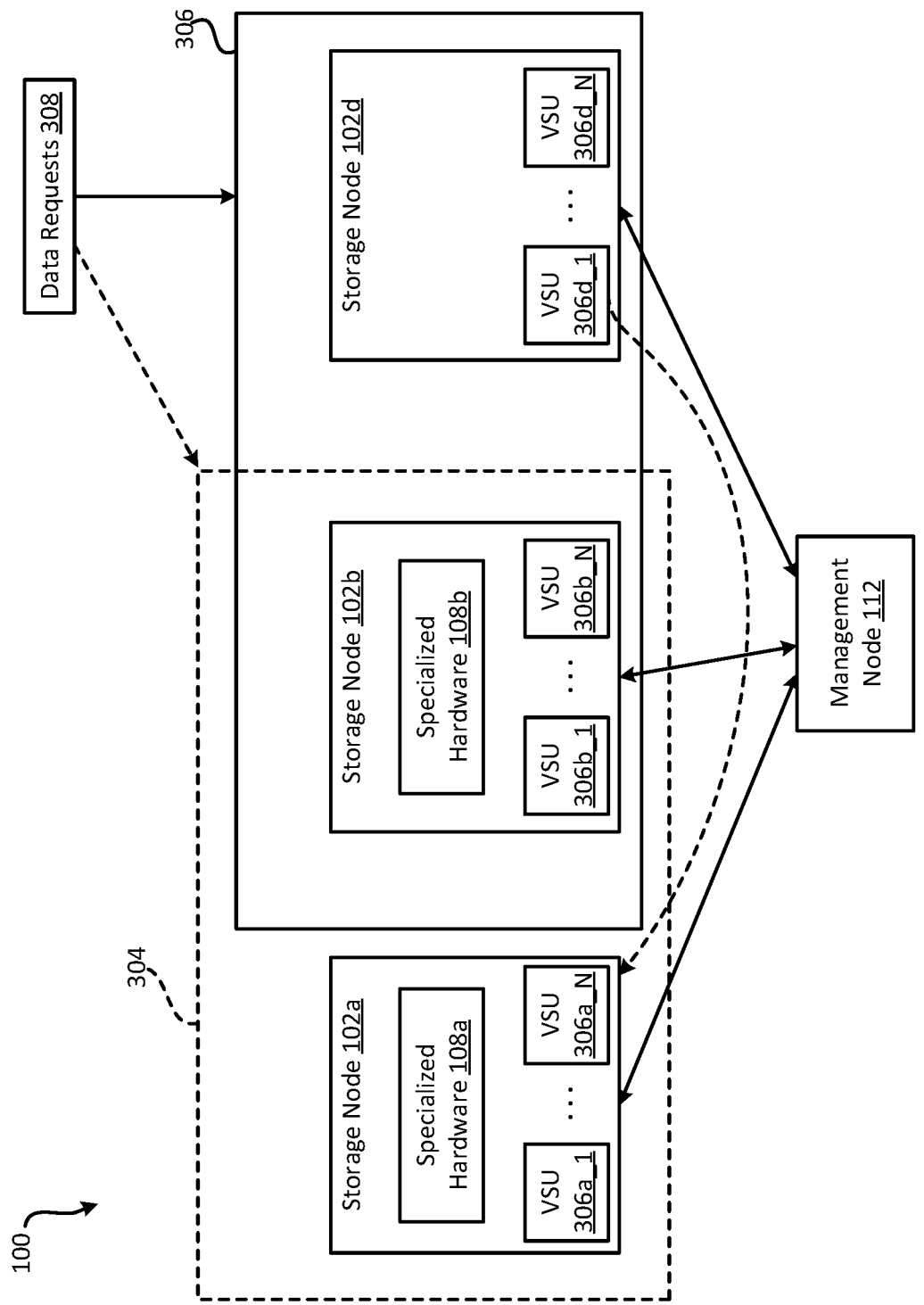
FIG. 3 is a block diagram of an example of data migration in a distributed storage system according to some aspects of the present disclosure.

FIG. 3 is a block diagram of an example of a migration process in a distributed storage system 100 according to some aspects of the present disclosure. In this example, the distributed storage system 100 includes a first node pool 302 for servicing data requests 308 from a client device, such as a laptop computer, desktop computer, server, or mobile device. The client device may be external to the distributed storage system 100. Within the first node pool 302 is a storage node 102d that lacks specialized hardware. As a result, the storage node 102d may be incapable of implementing the specialized functionality corresponding to the specialized hardware. The storage node 102d may include any number of virtual storage units (VSU) 306d. Virtual storage units can be logical devices that are mapped to physical storage devices for reading and writing data associated with data requests. The node locations and physical storage-device mappings of the VSUs in the distributed storage system 100 may be adjustable by the management node 112.

It may be desirable for the data requests 308 to be serviced by storage nodes that have the specialized functionality enabled, for example to obtain the performance or security improvements associated with the specialized functionality. For example, if the data requests 308 are higher priority, it may be desirable to service the data requests 308 using higher-performance storage nodes that have the specialized functionality enabled. To that end, the management node 112 can generate a second node pool 304 using the techniques described above, where the second node pool 304 includes storage nodes 102a-b on which the specialized functionality is enabled. The specialized functionality may be enabled on the storage nodes 102a-b based on the storage nodes 102a-b having corresponding specialized hardware 108a-b. The management node 112 can determine that VSU 306d_1 corresponds to (e.g., is a destination for) the data requests 308, and then migrate a VSU 306d_1 from storage node 102d to storage node 102a. This migration is represented in FIG. 1 by a dashed arrow. The management node 112 can also transmit a communication to the client device from which the data requests 308 originated, to notify the client device of the change in location of the VSU 306d_1. As a result, the client device can direct future data requests 308 corresponding to VSU 306d_1 to storage node 102a, so that the data requests 308 can be serviced by the second node pool 304 using the specialized functionality.

As one particular example, the management node 112 can determine that the data requests 308 have a particular priority level, such as a high priority level associated with sensitive data. Different data requests 308 may have different priority levels assigned by a user or the system. The management node 112 can also determine a VSU 306d_1 associated with the data requests 308 is located on a particular storage node 102d of the distributed storage system 100. The management node 112 can communicate with the particular storage node 102d to determine that the particular storage node 102d lacks a specialized storage adapter with inline data-encryption capabilities. For example, the management node 112 can receive status information from the particular storage node 102d indicating that the particular storage node 102d lacks the specialized storage adapter. Since the particular storage node 102d lacks the specialized storage adapter, the storage node 102d is likely incapable of implementing the inline data-encryption. Based on determining that (i) the data requests 308 have the particular priority level and (ii) the particular storage node 102d having the VSU 306d_1 associated with the data requests 308 does not have the specialized hardware, the management node 112 can migrate the VSU 306d_1 from the particular storage node 102d to another storage node 102a that has the specialized hardware 108a. As a result, the data requests 308 can be serviced by the other storage node 102a using the specialized functionality moving forward, given the presence of the specialized hardware 108a.

It will be appreciated that FIG. 3 is intended to be illustrative and non-limiting. Other examples may include more components, fewer components, different components, or a different arrangement of the components shown in FIG. 3. For instance, although the distributed storage system 100 includes three storage nodes in two node pools in the example of FIG. 3, the distributed storage system 100 may have any number of storage nodes spread across any number of node pools.

Figure 4:
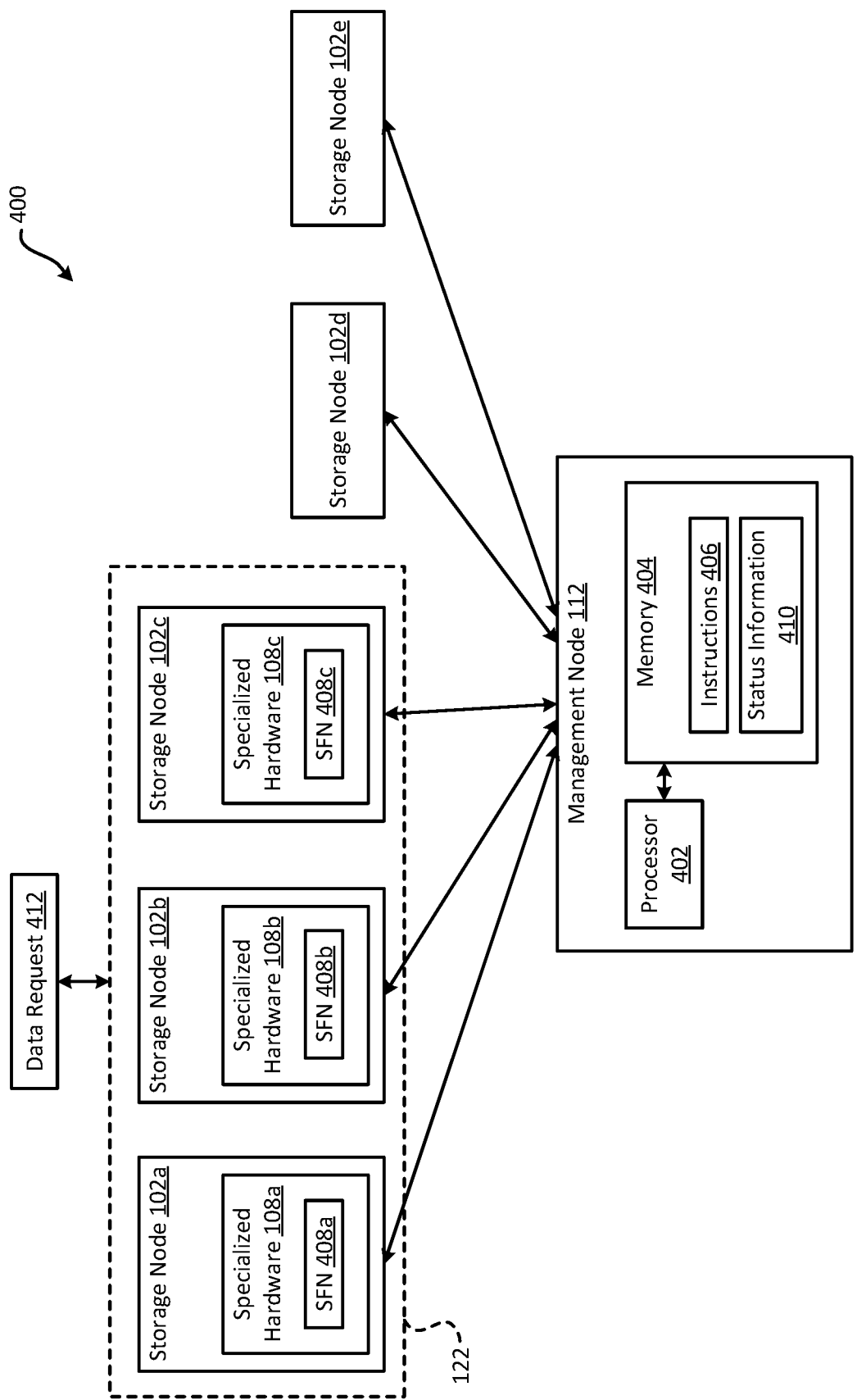
FIG. 4 is a block diagram of another example of a distributed storage system according to some aspects of the present disclosure.

FIG. 4 is a block diagram of another example of a distributed storage system 400 according to some aspects of the present disclosure. The distributed storage system 400 includes a management node 112 and storage nodes 102a-e with specialized hardware 108a-c.

In this example, the management node 112 includes a processor 402 communicatively coupled with a memory 404. The processor 402 can include one processor or multiple processors. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. The instructions 406 can include processor-specific instructions generated by a compiler or an interpreter from code written in any suitable computer-programming language, such as C, C++, C#, etc.

The memory 404 can include one memory or multiple memories. Non-limiting examples of the memory 404 can include electrically erasable and programmable read-only memory (EEPROM), flash memory, or any other type of non-volatile memory. At least some of the memory 404 includes a non-transitory computer-readable medium from which the processor 402 can read the instructions 406. The non-transitory computer-readable medium can include electronic, optical, magnetic, or other storage devices capable of providing the processor 402 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 406.

The processor 402 of the management node 112 can execute the instructions 406 to perform operations. In particular, the processor 402 can determine a subset of storage nodes 102a-c that include specialized hardware 108a-c based on status information 410 received from a plurality of storage nodes 102a-e of the distributed storage system 400. For example, the processor 402 can receive the status information 410 from the plurality of storage nodes 102a-e. The status information 410 can indicate whether each storage node in the plurality of storage nodes 102a-e has (e.g., is coupled to) a corresponding piece of specialized hardware. For example, the status information 410 can indicate that storage nodes 102a-c have specialized hardware 108a-c, and that storage nodes 102d-e does not have the specialized hardware. Based on the status information 410, the processor 402 can determine a subset of storage nodes 102a-c, from among the plurality of storage nodes 102a-e, having the specialized hardware 108a-c. The processor 402 can then generate a node pool 122 that includes the subset of storage nodes 102a-c. The specialized functionality 408a-c can be enabled on the subset of storage nodes 102a-c. The node pool 122 can be configured to perform the specialized functionality 408a-c in relation to a data request 412.

Figure 5:
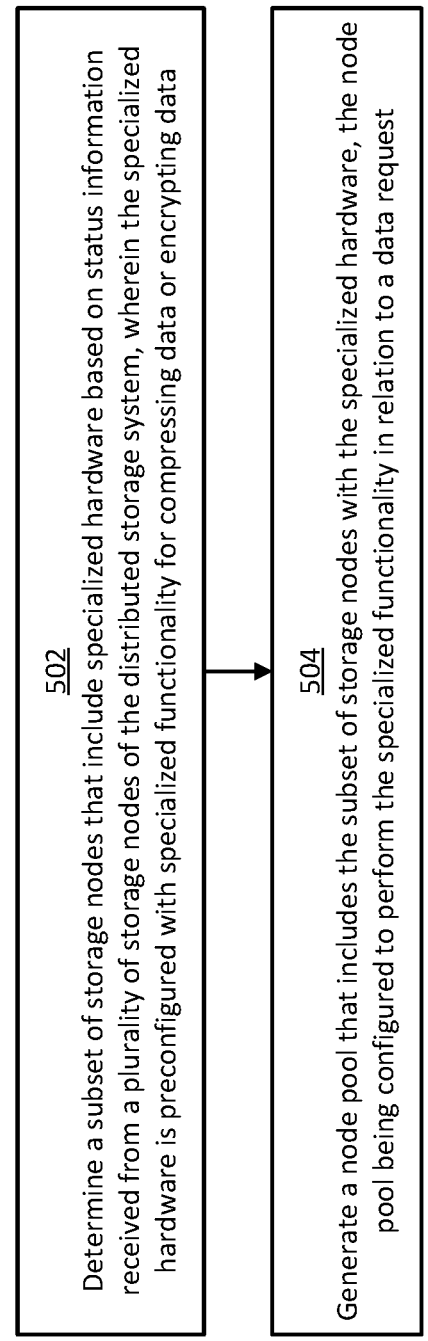
FIG. 5 a flow chart of an example of a process for pooling distributed storage nodes according to some aspects of the present disclosure.

In some examples, the processor 402 can implement some or all of the steps shown in FIG. 5. Other examples can include more steps, fewer steps, different steps, or a different order of the steps than is shown in FIG. 5. The steps of FIG. 5 are discussed below with reference to the components discussed above in relation to FIG. 4.

In block 502, a processor 402 determines a subset of storage nodes 102a-c that include specialized hardware 108a-c. The specialized hardware 108a-c can be preconfigured with specialized functionality 408a-c for compressing data or encrypting data, in some examples. The processor 402 can determine the subset of storage nodes 102a-c based on status information 410 received from the plurality of storage nodes 102a-e of a distributed storage system 400. The status information 410 can indicate whether each storage node in the plurality of storage nodes 102a-e has a corresponding piece of specialized hardware.

In block 504, the processor 402 generates a node pool 122 that includes the subset of storage nodes 102a-c with the specialized hardware 108a-c. In some examples, generating the node pool 122 may involve transmitting one or more commands to an application programming interface (API) of the distributed storage system 100 for causing the distributed storage system 100 to assign the storage nodes into the node pool 122.

After the node pool 122 is generated, the node pool 122 can perform the specialized functionality in relation to a data request 412. For example, data request 412 can correspond to a particular VSU that is part of the node pool 122. As a result, the data request 412 can be serviced by the node pool 122 using the specialized functionality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A management node of a distributed storage system, the management node comprising:
a processor; and
a memory including instructions that are executable by the processor for causing the processor to:

receive status information from a plurality of storage nodes of the distributed storage system, the plurality of storage nodes being separate from the management node, and the status information indicating which storage nodes of the plurality of storage nodes include specialized hardware that is preconfigured with specialized functionality for compressing data or encrypting data;

identify, based on the status information, a subset of storage nodes that include the specialized hardware from among the plurality of storage nodes;

in response to identifying the subset of storage nodes that include the specialized hardware, group the subset of storage nodes together into a node pool that includes the subset of storage nodes with the specialized hardware, the node pool being configured to perform the specialized functionality in relation to a data request;

determine that a particular data request has a particular priority level;

determine that a particular virtual storage unit (VSU) associated with the particular data request is located on a particular storage node of the distributed storage system;

determine, based on the status information, that the particular storage node does not have the specialized hardware; and based on determining that the particular data request has the particular priority level and that the particular storage node does not have the specialized hardware, migrate the particular VSU from the particular storage node to another storage node of the distributed storage system that has the specialized hardware.

2. The management node of claim 1, wherein each storage node in the plurality of storage nodes is configured to determine whether the storage node includes a respective piece of specialized hardware and responsively transmit a status communication to the management node, the status communication including respective status information indicating whether the storage node includes the respective piece of specialized hardware.

3. The management node of claim 1, wherein the node pool consists only of the storage nodes in the subset.

4. The management node of claim 1, wherein the memory further includes instructions that are executable by the processor for causing the processor to transmit signals to the subset of storage nodes for causing each storage node in the subset of storage nodes to enable the specialized functionality.

5. The management node of claim 4, wherein the signals are configured to cause each storage node in the subset of storage nodes to switch from (i) a first state in which the specialized functionality is disabled to (ii) a second state in which the specialized functionality is enabled.

6. The management node of claim 1, wherein the specialized hardware is manufactured with specialized circuitry for implementing the specialized functionality, prior to the specialized hardware being incorporated into the distributed storage system.

7. A method comprising:
receiving, by a processing device of a management node of a distributed storage system, status information from a plurality of storage nodes of the distributed storage system, the plurality of storage nodes being separate from the management node, and the status information indicating which storage nodes of the plurality of storage nodes include specialized hardware that is preconfigured with specialized functionality for compressing data or encrypting data;

identifying, by the processing device and based on the status information, a subset of storage nodes that include the specialized hardware from among the plurality of storage nodes;

in response to identifying the subset of storage nodes that include the specialized hardware, grouping, by the processing device, the subset of storage nodes together to form a node pool that includes the subset of storage nodes with the specialized hardware, the node pool being configured to perform the specialized functionality in relation to a data request;

determining, by the processing device, that a particular data request has a particular priority level;

determining, by the processing device, that a particular virtual storage unit (VSU) associated with the particular data request is located on a particular storage node of the distributed storage system;

determining, by the processing device and based on the status information, that the particular storage node does not have the specialized hardware; and based on determining that the particular data request has the particular priority level and that the particular storage node does not have the specialized hardware, migrating, by the processing device, the particular VSU from the particular storage node to another storage node of the distributed storage system that has the specialized hardware.

8. The method of claim 7, wherein each storage node in the plurality of storage nodes is configured to determine whether the storage node includes a respective piece of specialized hardware and responsively transmit a status communication, the status communication including respective status information indicating whether the storage node includes the respective piece of specialized hardware.

9. The method of claim 7, wherein the node pool consists only of the storage nodes in the subset.

10. The method of claim 7, further comprising transmitting signals to the subset of storage nodes for causing each storage node in the subset of storage nodes to enable the specialized functionality.

11. The method of claim 7, wherein the specialized hardware includes a storage adapter, a storage device, an input/output (I/O) interface, or a processing device, and wherein the specialized hardware has built-in circuitry configured for implementing data encryption or data compression.

12. The method of claim 7, further comprising:
determining, based on the status information, that a storage node of the plurality of storage nodes does not have the specialized hardware; and
excluding the storage node from the node pool based on determining that the storage node does not have the specialized hardware.

13. A non-transitory computer-readable medium comprising program code that is executable by a processor for causing the processor to:
receive status information from a plurality of storage nodes of a distributed storage system, the status information indicating which storage nodes of the plurality of storage nodes include specialized hardware that is preconfigured with specialized functionality for compressing data or encrypting data;

identify, based on the status information, a subset of storage nodes that include the specialized hardware from among the plurality of storage nodes;

in response to identifying the subset of storage nodes that include the specialized hardware, group the subset of storage nodes together to form a node pool that includes the subset of storage nodes with the specialized hardware, the node pool being configured to perform the specialized functionality in relation to a data request;
determine that a particular data request has a particular priority level;
determine that a particular virtual storage unit (VSU) associated with the particular data request is located on a particular storage node of the distributed storage system;
determine, based on the status information, that the particular storage node does not have the specialized hardware; and
based on determining that (i) the particular data request has the particular priority level and (ii) the particular storage node does not have the specialized hardware, migrate the particular VSU from the particular storage node to another storage node of the distributed storage system that has the specialized hardware.

14. The non-transitory computer-readable medium of claim 13, wherein each storage node in the plurality of storage nodes is configured to determine whether the storage node includes a respective piece of specialized hardware and responsively transmit a status communication, the status communication including respective status information indicating whether the storage node includes the respective piece of specialized hardware.

15. The non-transitory computer-readable medium of claim 13, further comprising program code that is executable by the processor for causing the processor to transmit signals to the subset of storage nodes for causing each of storage node in the subset of storage nodes to enable the specialized functionality.

16. The non-transitory computer-readable medium of claim 13, further comprising program code that is executable by the processor for causing the processor to:
determine, based on the status information, that a storage node of the plurality of storage nodes does not have the specialized hardware; and
exclude the storage node from the node pool based on determining that the storage node does not have the specialized hardware, wherein the node pool consists only of storage nodes having the specialized functionality enabled.

17. The management node of claim 1, wherein each storage node in the plurality of storage nodes is a server.

18. The management node of claim 1, wherein the memory further includes instructions that are executable by the processor for causing the processor to group the subset of storage nodes together into the node pool by transmitting one or more commands to an application programming interface associated with the distributed storage system.

19. The method of claim 7, wherein grouping the subset of storage nodes together into the node pool comprises transmitting one or more commands to an application programming interface associated with the distributed storage system.

20. The non-transitory computer-readable medium of claim 13, further comprising program code that is executable by the processor for causing the processor to:
group the subset of storage nodes together into the node pool by transmitting one or more commands to an application programming interface associated with the distributed storage system.

* * * * *